(12) United States Patent
Hamalainen et al.

(10) Patent No.: US 8,792,819 B2
(45) Date of Patent: *Jul. 29, 2014

(54) IDENTIFICATION OF RELAY BASE STATIONS IN WIRELESS NETWORKS

(71) Applicant: Nokia Siemens Networks Oy, Espoo (FI)

(72) Inventors: Jyri Kalervo Hamalainen, Oulu (FI); Vinh Van Phan, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/933,342

(22) Filed: Jul. 2, 2013

(65) Prior Publication Data
US 2013/0295840 A1    Nov. 7, 2013

Related U.S. Application Data

(63) Continuation of application No. 12/747,712, filed as application No. PCT/EP2008/067311 on Dec. 11, 2008, now Pat. No. 8,494,441.

(30) Foreign Application Priority Data

Dec. 14, 2007    (FI) ...................................... 20075911

(51) Int. Cl.
*H04B 3/36*   (2006.01)
*H04B 7/14*   (2006.01)

(52) U.S. Cl.
USPC ...................................... 455/7; 455/9; 455/16

(58) Field of Classification Search
None
See application file for complete search history.

(56) References Cited

U.S. PATENT DOCUMENTS

| | | | |
|---|---|---|---|
| 7,283,786 B2 | 10/2007 | Shimada et al. | 455/9 |
| 2004/0106373 A1 * | 6/2004 | Shimada et al. | 455/9 |

FOREIGN PATENT DOCUMENTS

| | | | |
|---|---|---|---|
| EP | 1385349 A2 * | 1/2004 | |
| WO | WO-96/22636 | 7/1996 | |
| WO | WO-98/29962 | 7/1998 | |
| WO | WO-01/48946 A1 | 7/2001 | |

* cited by examiner

*Primary Examiner* — Philip Sobutka
(74) *Attorney, Agent, or Firm* — Harrington & Smith (57) ABSTRACT

It is provided a solution for assigning to a relay node of a wireless telecommunication system an identifier from which a corresponding identifier of a central node associated with the relay node is derivable according to a determined rule. Accordingly, the identifiers of central nodes and their relay nodes are assigned in a manner which facilitates identification of a central node from a received relay node identifier, thereby avoiding the necessity of consulting higher layer controllers in order to identify the central node.

23 Claims, 4 Drawing Sheets

IDENTIFICATION OF RELAY BASE STATIONS IN WIRELESS NETWORKS

CROSS-REFERENCE TO RELATED APPLICATIONS

This application is a continuation of U.S. patent application Ser. No. 12/747,712, which is the National Stage of International Application No. PCT/EP2008/067311, filed Dec. 11, 2008.

FIELD

The invention relates to the field of cellular radio telecommunications and, particularly, to cellular communication systems utilizing relay networks.

BACKGROUND

In the environment of radio access technologies, extension of wireless network radio signal coverage by use of various types of relay nodes, e.g. base stations, has recently been a target of intensive studies. An amplify-and-forward relay node amplifies a received analog signal and transmits the amplified signal forward. This type of amplification improves the signal power but tends to amplify also the noise received with the actual content of the signal. A decode-and-forward relay node regenerates the received signal and transmits the regenerated signal forward. During the regeneration, the decode-and-forward relay node may apply various digital operations on the received signal. Due to transmission control measures during the regeneration stage, a decode-and-forward relay node typically provides better signal quality than an amplify-and-forward relay node. Use of decode-and-forward relay nodes to extend the coverage of a single base station in a radio access network is considered to improve the capacity of the single base station and to enhance the signal quality received by user equipment.

In a cellular telecommunication system, it is preferable to identify each base station, both "regular" base stations and relay nodes. Typically, a given base station is assigned with a global identifier identifying the base station in the whole public land mobile telecommunication network (PLMN) and a physical identifier identifying the base station in a geographically limited area. The number of physical identifier is typically limited to a few hundred in the PLMN and, therefore, the physical identifiers are reused. Conventionally, the identifiers of the base stations are assigned from a pool of available identifiers independently for each base station. While this is a very simple approach, better performance of the system may be obtained with smarter allocation of identifiers.

BRIEF DESCRIPTION

According to an aspect of the present invention, there are provided methods as specified in claims 1 and 12.

According to another aspect of the present invention, there are provided apparatuses as specified in claims 16 and 27.

According to another aspect of the present invention, there are provided apparatuses as specified in claims 31 and 42.

According to yet another aspect of the present invention, there are provided computer program products embodied on computer readable distribution media as specified in claims 46 and 47.

Embodiments of the invention are defined in the dependent claims.

LIST OF DRAWINGS

Embodiments of the present invention are described below, by way of example only, with reference to the accompanying drawings, in which.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The embodiments of the invention are described below with the assumption that one skilled in the art has knowledge about the general structure and elements of a conventional cellular telecommunication system. Therefore, the description of the structure of a cellular radio access network and interconnections between elements of a conventional cellular radio telecommunication system is omitted in order not to obscure the invention with unnecessary details. The description focuses on describing the embodiments in an evolution version of a third generation UMTS (Universal Mobile Telecommunication System) but the embodiments may be applied also to other cellular wireless networks, such as WIMAX (Worldwide Interoperability for Microwave Access) based on IEEE 802.16 standard. As known in the art, the evolution version of the UMTS utilizes orthogonal frequency division multiple access (OFDMA) for downlink communications and single carrier FDMA for uplink communications in the physical radio interface.

Figure 1:
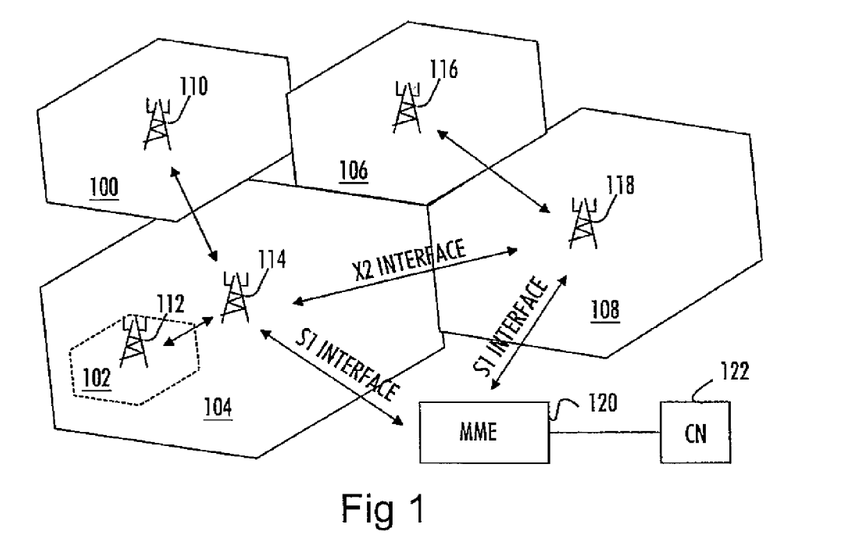
FIG. 1 illustrates a structure of a relayed cellular network of a wireless telecommunication system.

A general architecture of a cellular telecommunication system employing relay base stations as relay nodes is illustrated in FIG. 1. In FIG. 1, coverage area of a first central base station 114 (referred to as a central node from now on) is extended by employing two relay base stations (referred to as relay nodes from now on) 110 and 112. As illustrated in FIG. 1, a coverage area of a relay node may increase the overall coverage area of the central node 114, as does the relay node 110. On the other hand, the coverage area of the other relay node 112 resides within the coverage area of the central node. This may be used to provide coverage in severely shadowed areas within a cell 104 of the central node or to increase capacity of the central node within the area in which the coverage areas (cells 102 and 104) overlap. Accordingly, the overall coverage area of the central node is increased to cover cells 100, 102, and 104 and, additionally, extra capacity is provided in cell 102. Similarly, relay node 116 extends the coverage area of a second central node 118 to cover both cells 106 and 108. The physical layer between the central node and the relay nodes may be selected according to the application, for example a fixed or wireless connection may be employed. Each of the relay nodes may be connected to the base station directly or via another relay node.

A communication connection may be established between the central nodes 114 and 118 for the purpose of transferring at least control information between the central nodes 114 and 118. The control information may include, for example, handover information needed for mobility management of mobile terminals. The communication connection between the base stations 114, 118 is referred to as X2 interface in the 3GPP ($3^{rd}$ Generation Partnership Project) specifications for E-UTRAN (enhanced UMTS terrestrial radio access network). The X2 interface may also transfer other types of control information, including inter-cell power control information, information on transmission parameters of central nodes, etc.

The central nodes 114, 118 are also connected to a mobility management entity (MME) 120 controlling the mobility of the mobile terminals in the radio access network. In other words, the MME 120 is a higher mobility control entity serving as an anchoring point for mobile terminal connections. The interface between the central nodes 114, 118 and the MME 120 is known as S1 interface in the 3GPP specifications for UTRAN. The MME 120 is further connected to a core network 122.

Figure 2:
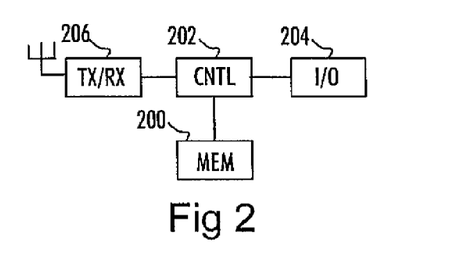
FIG. 2 illustrates a general block diagram of a base station of a radio access network of the wireless telecommunication system.

FIG. 2 illustrates a very general block diagram of components of a base station which may be a central node or a relay node. The base station may comprise a communication unit 206 to provide a radio connection with mobile terminals but also with other base stations. Let us remind that a relay node and a central node may communicate over an air interface. The communication unit 206 may perform analog operations necessary for transmitting and receiving radio signals.

The base station may further comprise an input/output (I/O) interface 204 to provide the base station with a wired communication connection. In case the base station is the central node, the I/O interface 204 may enable a communication connection with other central nodes through the X2 interface and with the MME through the S1 interface. If the connection between the central node and one or more relay nodes is established as a wired link, the I/O interface 204 may enable a communication connection with the relay nodes as well. If the base station is a relay node, the I/O interface 204 may enable a wired connection with a central node controlling the relay node. If the connection between the relay node and the controlling central node is formed through the air interface, the I/O interface 204 may be omitted.

The base station may further comprise a controller or a processing unit 202 configured to control functions of the base station. The processing unit 202 may handle the establishment, operation and termination of radio connections with the mobile terminals (and other base stations). The processing unit 202 may also handle the establishment, operation, and termination of wired connections through the I/O interface 204. The processing unit 202 may be implemented by a digital signal processor with suitable software embedded in a computer readable medium, or by separate logic circuits, for example with ASIC (Application Specific Integrated Circuit).

Furthermore, the base station may include a memory unit 200 storing parameters and information necessary for the operation of the base station. For example, the memory unit 200 may store identifiers of base stations and other elements of the system with which the base station is capable of communicating. Additionally, the memory unit 200 may store transmission parameters and data related to wireless communication with mobile terminals.

Let us now consider communications in the relayed radio access network. The relayed radio access network may be configured for single-frequency network operation in which a central node and relay nodes controlled by the central node function as a single transmitter. Accordingly, the transmission of the nodes is synchronized with each other and the nodes transmit the same data. The single-frequency network operation may be used, for example, broadcast and multicast transmissions but also for providing higher reception signal levels for an individual mobile terminal. Alternatively, traffic load allocated to the central node may be distributed amongst the central node and the relay nodes so that a portion of traffic associated with a given mobile terminal is transferred via the central portion while another portion of the traffic is transferred via a relay node. In both cases, the network should be able to identify and address different base stations regardless of whether they are central nodes or relay nodes. In other words, the network should be able to control individual base stations separately. In such case, each base station should be addressed separately for traffic allocation and transmission control purposes. For that purpose, each base station should have a unique identifier identifying the base station in the radio access network, or even in the whole PLMN. Moreover, each base station (relay and central nodes) may be identifiable by mobile terminals for neighboring cell measurement and handover purposes, for instance. If a relay node extends the coverage of a central node, it is advantageous to define the relay node to whose coverage area the mobile terminal enters.

The MME 120 may be a controlling entity storing identifiers of each base station under control of the MME 120, i.e. identifiers of base stations 110 to 118 in the example of FIG. 1. Each central node (central base station) may, however, store identifiers of neighboring central nodes with which the central node is able to communicate. When a central node needs to communicate with another central node, it may simply obtain the stored identifier of the other central node from its memory unit, e.g. memory unit 200 in FIG. 2, and transmit information containing the identifier of the other central node. However, conventional central nodes do not store identifiers of relay nodes associated with the other central nodes. Naturally, each central node has knowledge about the identifiers of the relay nodes it controls. Accordingly, if a given central node receives an identifier of a relay node not controlled by the central node and the central node has to find out the identifier of a central node associated with the relay node corresponding to the received identifier, the central node has to consult the MME in order to find out the corresponding central node. Upon receiving the identifier of the central node matching with the received relay node identifier, the two central nodes may exchange information over the X2 interface. Consulting the MME in order to link the received relay node identifier with a central node increases signaling in the system.

Therefore, it is advantageous for the central node to derive the identifier of the central node directly from the received relay node identifier. According to an embodiment of the invention, a relay node of a wireless network is assigned with a unique identifier from which a corresponding identifier of a central node associated with the relay node is derivable according to a determined rule. In more detail, the central node (or the processing unit of the central node) may be configured to analyze the received relay node identifier according to the determined rule in order to find out the identifier of the central node controlling the relay node. The determined rule utilizes a preset link between the identifiers of the relay node and the central node associated with the relay node. The identifiers may be global cell identifiers of the central and relay nodes identifying the base stations (or cells) in the PLMN, but also other unique identifiers may be used, as disclosed later.

Figure 3:
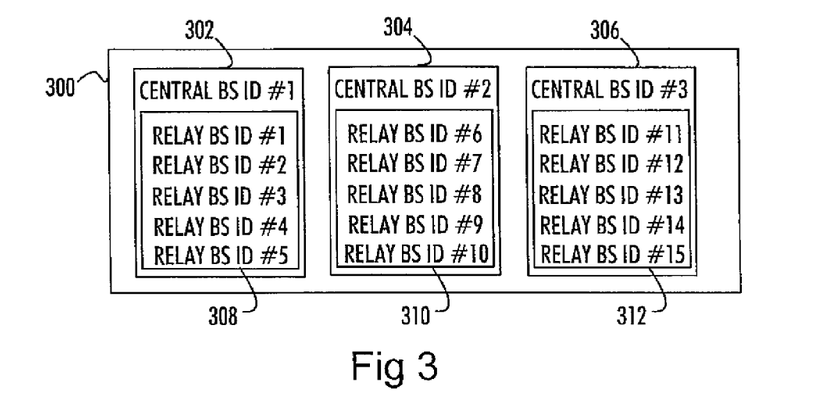
FIG. 3 illustrates a database according to an embodiment of the invention.

First, let us refer to FIG. 3 illustrating a database 300 comprising identifiers of central nodes and relay nodes. The database 300 includes segments 302, 304, 306, wherein each segment is associated with a different central node identified by a central node identifier. Each segment 302 to 306 then includes a sub-segment 308, 310, and 312, respectively, comprising identifiers of relay nodes associated with a particular central node. Accordingly, the database 300 contains information on which relay nodes each central node controls, i.e. linkage between a central node and relay node under the control of the central node. Each central node may store at least the segment associated with the identifier of the central node. Additionally, each base station may store identifiers of a limited number of neighboring base stations. The MME may store the whole database 300 including the identifiers of central nodes under the control of the MME but also identifiers of relay nodes controlled by each central node and information on which central node controls which relay node(s).

Figure 4:
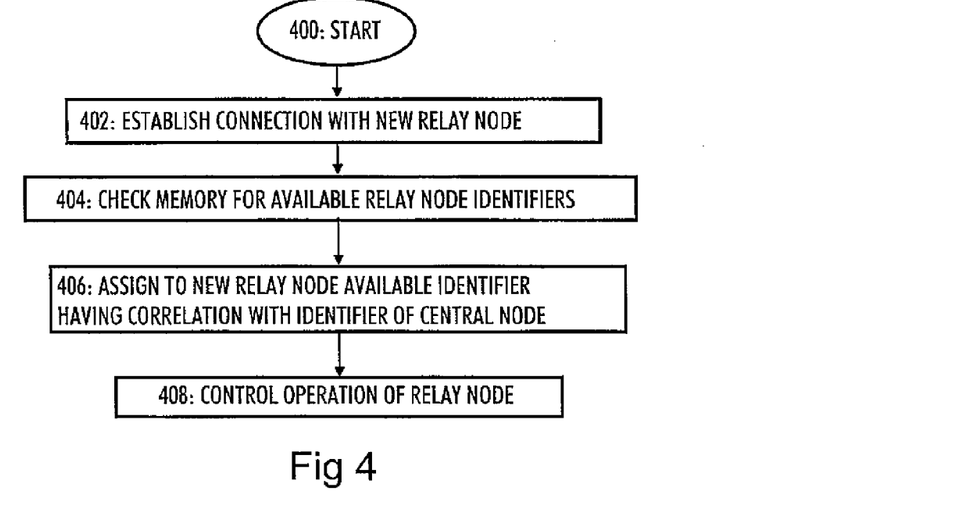
FIG. 4 is a flow diagram illustrating an embodiment of a process for assigning an identifier to a relay base station.

Let us consider a process for assigning to a relay node a unique identifier according to an embodiment of the invention with reference to FIG. 4. The assignment of the identifier may be carried out in a central node when a new relay node is installed under the control of the central node in the radio access network. FIG. 4 illustrates a flow diagram describing the process which may be embodied as a computer program in the processing unit and the memory unit of the central node. The process starts in block 400. In block 402, the presence of a new relay node is detected and a communication connection is established between the central node and the new relay node.

In block 404, the memory unit is checked for relay node identifiers allocated to the central node and still available for assignment. The MME and neighboring central nodes may also be consulted for the available relay node identifier. If an available relay node identifier is found, the identifier is assigned to the relay node in block 406. In this embodiment, the relay node identifiers allocated to the central node have controlled correlation with the identifier of the central node. Let us consider an example in which the identifiers of the base stations are global identifiers unique to each base station in the whole PLMN. These identifiers are known also as logical identifiers in the art. In the current 3GPP specifications for UTRAN, the global identifier is a 28-bit sequence, but it may also be a bit sequence of any other length. The identifiers of the central node and the relay node under the control of the central node may have controlled correlation in such manner that certain bits in the identifiers of the base stations are identical. Another way of inducing correlation between the identifiers is to arrange certain bits in the identifiers of the relay nodes to be opposite to the corresponding bits in the identifier of the central node. Any other means for including correlation between the identifiers are also possible.

When the central node has assigned the unique identifier to the new relay node and when the relay node has been configured to be fully operational, the operation of the relay node with respect to the communications in the radio access network is controlled in block 408.

Instead of allocating to the central node relay node identifiers having correlation with the identifier of the central node, the actual identifiers of the base station may be independent from each other but linking information linking the identifiers to each other may be provided. The linking information may comprise information mapping each relay node identifier to a corresponding central node identifier. For example, the linking information may include bit positions of the relay node identifier whose values should be inverted in order to obtain the identifier of the central node, for example. Any other type of linking information is naturally possible. Alternatively, the central node may store a segment of FIG. 3 associated with the identifier of the central node but also segments associated with identifiers of neighboring base stations. In this case, the linking information is the segmentation of the identifiers. That is, when the central node has to find a central node associated with a received relay node identifier, the central node may check the database to find a segment including the received relay node identifier and read the central node identifier associated with that segment.

Next, let us consider a process for identifying an identifier of the central node from a received relay node identifier. Let us still consider the case where the identifiers are global identifiers of the base stations. As an exemplary situation, let us consider a case where a mobile terminal measures reception power levels of signals broadcast from neighboring cells. Broadcast signals transmitted by the base stations (both central and relay nodes) include information from which the mobile terminal can derive a physical layer identifier of the base stations. The physical layer identifiers may be transmitted on a synchronization channel, for example. Additionally, each base station broadcasts its global identifier, and the mobile terminal may extract both physical layer and global (higher layer) identifier from the received broadcast signals. Typically, the physical layer identifier is extracted straightly from the synchronization channel, and the global identifier is extracted after the synchronization with the base station is established.

The mobile terminal measures a reception signal level of each neighboring base station that the mobile terminal is capable of detecting and transmits both the reception signal level and the global identifier of the corresponding base station to the central node either directly or through a relay node depending on the base station serving the mobile terminal. Let us consider a case in which the mobile terminal receives from a neighboring relay node a signal level such high that handover from a currently serving base station to the neighboring relay node is feasible. Let us assume that the relay node being a target for the handover is controlled by a central node different from the central node currently serving the mobile terminal. Accordingly, the central node currently serving the mobile terminal has to deduce the new central node, to which the mobile terminal is to be handed over, from the received identifier of the relay node being the target base station of the handover.

Figure 5:
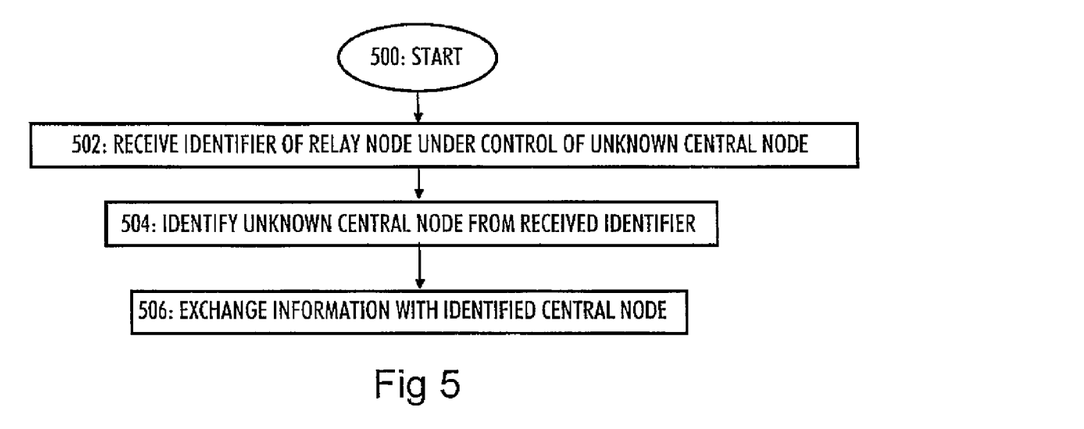
FIG. 5 is a flow diagram illustrating an embodiment of a process for identifying a central node from a received relay node identifier.

Let us consider the process of identifying the target central node from the received relay node identifier by referring to FIG. 5. The process may be executed as a computer program in the processing unit of the central node attempting to identify the target central node. The process starts in block 500. In block 502, the central node currently serving the mobile terminal receives from the mobile terminal (either directly or through a relay node) the measurement report indicating high reception signal level from a base station identified by a global identifier included in the report. The received global identifier as such may be unknown to the central node, i.e. it may not belong to a stored list of neighboring central nodes. Accordingly, the central node may deduce that the identifier is an identifier of a relay node.

In block 504, the central node identifies the target central node associated with the received relay node identifier according to a determined rule. The determined rule utilizes the predetermined link between the identifiers of the relay nodes and their controlling central nodes. If the process for identifying the central node associated with the received relay node identifier fails, i.e. the central node is not able to identify the target central node from the received relay node identifier, the central node may consult the MME in order to acquire the identifier of the target central node. Upon identification of the central node, the two central nodes exchange information related to the handover procedure in block 506. In more detail, the connection of the mobile terminal is handed over to the identified central node which controls the target relay node to establish a communication connection with the mobile terminal.

This process reduces signaling in the network because the central node may independently derive the identifier of the other central node from a received identifier of a relay node controlled by the other central node. Accordingly, the central node does not have to consult the MME for the identifier of the central node controlling the relay node whose identifier was received.

Figure 6A:
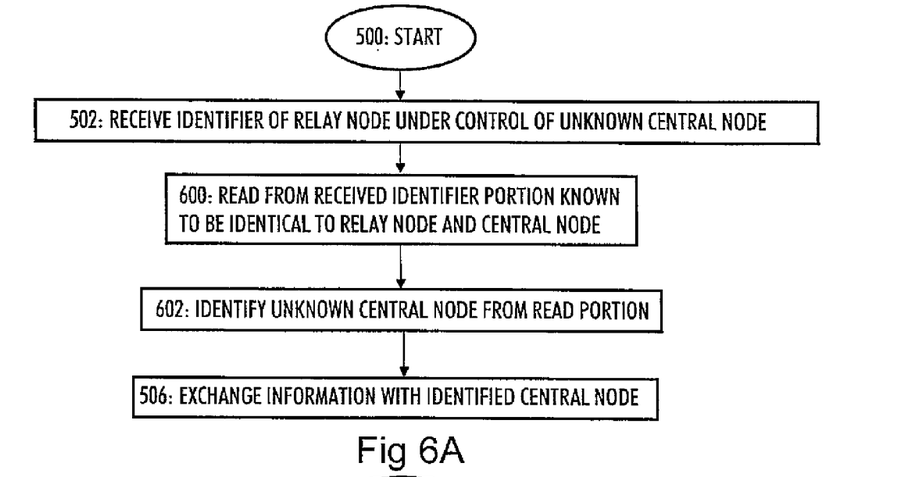
FIG. 6A is a flow diagram illustrating an embodiment of another process for identifying a central node from a received relay node identifier.
Figure 6B:
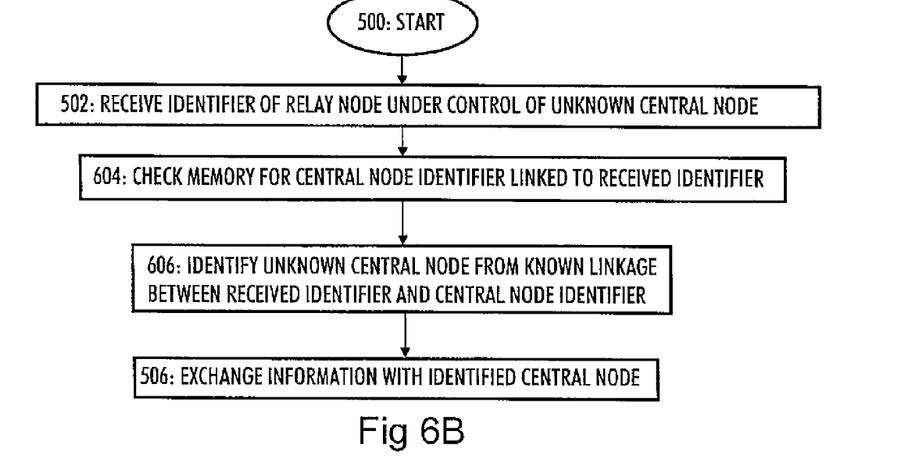
FIG. 6B is a flow diagram illustrating an embodiment of still another process for identifying a central node from a received relay node identifier.

FIGS. 6A and 6B illustrates processes illustrating the actual identification of the central node associated with the received relay node identifier in greater detail. In FIGS. 6A and 6B, blocks having the same reference numerals as those in the process of FIG. 5 have the same functionality. Process of FIG. 6A relates to a case where the identifiers of the central node and the relay node are correlated, and the linking information between the identifiers is utilized in the process of FIG. 6B.

Referring to FIG. 6A, the central node attempting to identify the target central node from the received relay node identifier utilizes known correlation between the identifiers of relay nodes and their corresponding controlling central nodes. In other words, the central node has knowledge of the type of correlation between the identifiers and has knowledge about the rule how the correlation should be utilized in order find out the identifier of the target central node. In the particular process illustrated in FIG. 6A, the central node has knowledge that a certain portion in the identifiers of a given central node and relay nodes controlled by the central node are identical. The portion may be different at least amongst neighboring base station within a predefined area. Accordingly, the central node attempting to identify the target central node reads in block 600 from the received relay node identifier a portion known to be identical with the target central node. In block 602, the central node checks the memory unit including the central base station identifiers of at least the neighboring central nodes for a central node identifier having the corresponding portion identical with the portion read in block 600. If the central node identifier having the corresponding portion identical with the read portion is found from the memory, the central node considers the target central node as being identified and exchanges the information with the identified target central node in block 506.

If the correlation between the identifiers of a given relay node and its controlling central node is that the corresponding portions of the identifiers are inverted instead of being identical, the process of FIG. 6A may be modified to apply to this embodiment. In such a case, an additional step may be added between blocks 600 and 602 in which the portion read from the received relay node identifier is inverted to obtain the corresponding portion of the central node identifier. Additionally, block 600 is modified such there is read from the received relay node identifier the portion known to be opposite to the corresponding portion of the target central node identifier.

As mentioned above, the process illustrated in FIG. 6B utilizes the linking information linking the relay node identifiers to their controlling central node identifiers. Accordingly, the linking information may be considered as intermediate information needed to associate the actual identifiers with each other. In block 604, the memory is checked for a central node identifier linked to the received relay node identifier. For example, if the memory unit stores the database similar to that illustrated in FIG. 3, that is the identifiers of neighboring central nodes and relay nodes ender the control of the central nodes, the memory unit may be checked for the received relay node identifier. When the relay node identifier is found from a given sub-segment of the database, the central node identifier linked to that sub-segment is read from the database. Accordingly, the target central node is identified in block 606.

Above, the embodiments are described in the context that the central node performs the identification of the target central node from the received relay node identifier. The identification may, however, be performed in the mobile terminal as well. The mobile terminals have access to the global identifiers of each base station and, therefore, the mobile terminal may perform the steps illustrated in FIGS. 5, 6A, and/or 6B.

UTRAN radio interface protocols define Cell Radio Network Temporary Identity (C-RNTI) as an identifier for a mobile terminal for use in scheduling of transmission time intervals and transmission radio resources. Accordingly, each mobile terminal is addressed with a different C-RNTI. If the communication between a central node and a relay node is carried out wirelessly over a radio interface, the unique identifier, e.g. the global cell identifier, of the relay node may be used as a C-RNTI for the relay node. Accordingly, the central node may transmit scheduling information to the relay node by including the identifier of the relay base station in the scheduling information.

In the above-described embodiment, the global cell identifiers are used as identifiers assigned in such manner that there is a link between the identifiers of a given central node and relay nodes controlled by the central node to enable derivation of an identifier of any central node from an identifier of a relay node associated with the central node. In addition to the global cell identifiers, or as an alternative, other unique identifiers may be assigned in such manner that a central node identifier may be derived from the corresponding identifier of a relay node identifier. One such identifier is a system frame number identifying the framing and timing of a given cell. The system frame number is referred to when scheduling transmission time intervals to data transfer between a base station and a mobile terminal. Additionally, certain timers may be bound to the system frame number.

Figure 7:
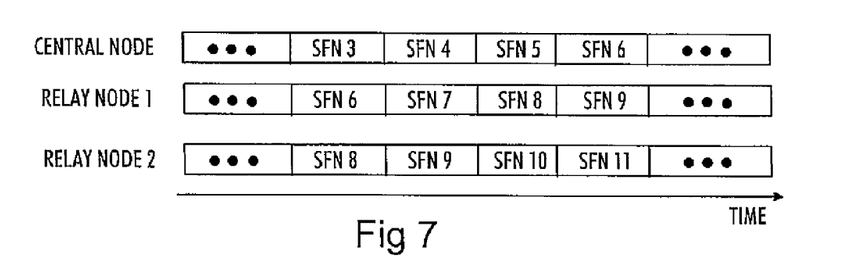
FIG. 7 illustrates utilization of offsets between system frame numbers of a central node and relay nodes as identifiers.

In more detail, the unique identifier of a relay node identifying the relay node from the other relay nodes controlled by the same central node may be a system frame number offset from the system frame number of a central node controlling the relay node. FIG. 7 illustrates different system frame number offsets assigned to a central node and two relay nodes controlled by the central node. As can be seen, relay node 1 is assigned a system frame number offset of +3 from the system frame number of the central node. On the other hand, relay node 2 is assigned a system frame number offset of +5 from the system frame number of the central node. Accordingly, the global cell identifiers of a central node and associated relay nodes may be identical. If the identifiers of the central node and relay nodes under the control of the central node are identical, each node in the PLMN may then be identified with a combination of the global cell identifier and its system frame number offset from the system frame number of the central base station. The offset of the central base station is naturally zero in this case.

Figure 8:
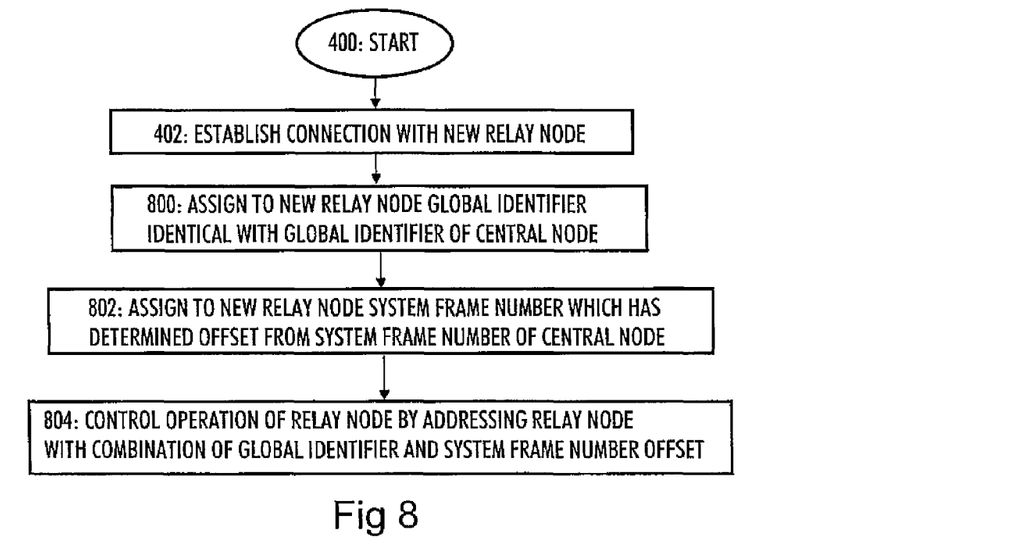
FIG. 8 is a flow diagram illustrating an embodiment of a process for assigning a unique identifier to the relay node.

FIG. 8 illustrates a process for assigning to a relay base station a unique identifier from which the corresponding identifier of the base station is derivable according to a given rule. The blocks denoted by the same reference numerals as in FIG. 4 have the same functionality. Accordingly, the assignment may be performed in an initial setup phase of the relay node. In block 800, the central node assigns to the new relay node a global identifier identical with the global identifier of the central node. In block 802, the central node assigns to the new relay node a system frame number which has determined offset from a corresponding system frame number of the central node. The system frame number offset assigned to the new relay node is an offset not associated with any other relay node of the central node. However, if the central node determines to always control two (or more) relay nodes with the same control information, the central node may choose to assign the same system frame number and global cell identifier to the two relay nodes. In block 804, the central node control the operation of the new relay node by addressing the new relay node with a combination of the global cell identifier and the system frame number offset. If the connection between the central node and the relay node is established through the radio interface, the global cell identifier discriminates the new relay node from all the other central nodes and their relay nodes and the system frame number discriminates the new relay node from the other relay nodes controlled by the central node.

For the purposes of identifying a neighboring central node in order to perform a handover from one central node to another, for example, this assignment is simpler in the sense that a central node and relay nodes have the same global cell identifier. Accordingly, the central node may identify the target central node straightly from the neighboring cell measurement report received from a given mobile terminal being handed over. However, the mobile terminal may be configured to include also system frame numbers in the measurement reports in order to facilitate a handover to a particular relay node controlled by the target central node. The mobile terminal may synchronize to broadcast signals received from different base stations and obtain the system frame numbers of different base stations upon obtaining the synchronization.

In some cases, it is desirable to have the system frame number the same between a central node and relay nodes controlled by the central node. If the global cell identifiers of the central node and the relay nodes are also kept identical to facilitate the association of the central node and its relay nodes, the physical layer cell identifier may be used to discriminate the central node and its relay nodes from each other. As mentioned above, the physical layer (L1) dell identifier is unique for each cell in a geographically limited area, and it is transmitted by a base station on a physical broadcast channel as primary and secondary synchronization signals. In the evolution version of the UTRAN based on OFDMA, i.e. E-UTRAN, the physical layer identifier is defined by a reference signal pattern unique for each cell. In the E-UTRAN, there are a total of 504 different reference signal patterns reused in different geographical areas.

Figure 9:
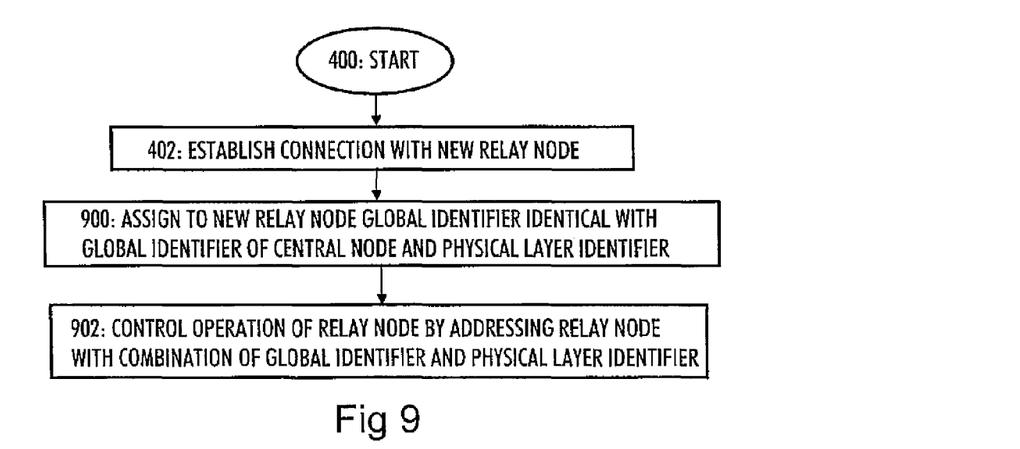
FIG. 9 is a flow diagram illustrating an embodiment of another process for assigning a unique identifier to the relay node.

FIG. 9 illustrates a process for assigning to a new relay node a unique identifier which is a combination of the global identifier and the physical layer identifier. The blocks denoted by the same reference numerals as in FIG. 4 have the same functionality. In block 900, the central node assigns to the new relay node the global identifier which is identical with the global identifier of the central node itself. Additionally, the central node assigns to the new relay node a physical layer identifier from a list of physical layer identifiers available for use. To ensure that the physical layer identifier is available for use, the central node may consult the MME and/or neighboring central nodes.

When the central node has assigned to the relay node the unique identifier which, in this case, is the combination of the global cell identifier and the physical layer identifier, the central node may inform the MME and the neighboring central nodes of the identifiers assigned to the new relay node. The MME and the neighboring central nodes may then send an acknowledgment to indicate approval of the identifiers. Additionally, the MME and possibly also the neighboring central nodes may store the identifiers of the new relay node.

In block 902, the central node controls the operation of the new relay node by addressing the new relay node with the combination of the global identifier and the physical layer identifier. Additionally, mobile terminals may indicate the new relay node with the same identifier combination in the measurement reports, for example.

The processes or methods described in FIGS. 4 to 6B, 8, and 9 may also be carried out in the form of a computer process defined by a computer program. The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to cellular or mobile telecommunication systems defined above but also to other suitable telecommunication systems. The protocols used, the specifications of mobile telecommunication systems, their network elements and subscriber terminals, develop rapidly. Such development may require extra changes to the described embodiments. Therefore, all words and expressions should be interpreted broadly and they are intended to illustrate, not to restrict, the embodiment.

It will be obvious to a person skilled in the art that, as technology advances, the inventive concept can be implemented in various ways. The invention and its embodiments are not limited to the examples described above but may vary within the scope of the claims.

The invention claimed is:
1. An apparatus comprising:
one or more processors; and
one or more memories including computer program code, the one or more memories and the computer program code configured, with the one or more processors, to cause the apparatus to perform at least the following:

addressing a relay base station of a cellular radio access network with a cell identifier, characterized by addressing the relay base station with the cell identifier from which a corresponding cell identifier of a central base station associated with the relay base station is derivable according to a determined rule.

2. The apparatus of claim 1, wherein the cell identifier of the relay base station is arranged to have controlled correlation with the corresponding cell identifier of the central base station.

3. The apparatus of claim 1, wherein a portion of the cell identifier of the relay base station is arranged to be identical with the corresponding cell identifier of the central base station.

4. The apparatus of claim 1, wherein the one or more memories and the computer program code are further configured, with the one or more processors, to cause the apparatus to perform:
providing linking information linking the cell identifier of the relay base station to the corresponding cell identifier of the central base station.

5. The apparatus of claim 1, wherein the cell identifier of the relay base station is a global cell identifier identifying the relay base station in a public land mobile telecommunication network.

6. The apparatus of claim 1, wherein the one or more memories and the computer program code are further configured, with the one or more processors, to cause the apparatus to perform:
assigning to the relay base station of the wireless telecommunication system the cell identifier from which the corresponding cell identifier of the central base station associated with the relay base station is derivable according to the determined rule.

7. The apparatus of claim 1, wherein the one or more memories and the computer program code are further configured, with the one or more processors, to cause the apparatus to perform:
receiving a cell identifier of a relay base station of a cellular radio access network; and
identifying a second central base station associated with the relay base station from the received cell identifier of the relay base station according to the determined rule.

8. The apparatus of claim 1, wherein the one or more memories and the computer program code are further configured, with the one or more processors, to cause the apparatus to perform:
identifying a second central base station associated with the relay base station from at least a portion of the cell identifier of the relay base station, wherein at least the portion of the cell identifier of the relay base station is known to be identical to the corresponding portion of a cell identifier of the second central base station.

9. The apparatus of claim 1, wherein the one or more memories and the computer program code are further configured, with the one or more processors, to cause the apparatus to perform:
storing information;
checking the one or more memories for linking information linking the identifier of the relay base station to a cell identifier of a second central base station; and
identifying the second central base station from the cell identifier of the relay base station and from the linking information.

10. The apparatus of claim 1, wherein the one or more memories and the computer program code are further configured, with the one or more processors, to cause the apparatus to perform:
identifying a second central base station associated with the relay base station independently.

11. The apparatus of claim 1, wherein said apparatus is a base station.

12. An apparatus comprising:
one or more processors; and
one or more memories including computer program code, the one or more memories and the computer program code configured, with the one or more processors, to cause the apparatus to perform at least the following:
receiving a cell identifier of a relay base station of the cellular radio access network; and
identifying a central base station associated with the relay base station from the received cell identifier of the relay base station according to a determined rule.

13. The apparatus of claim 12, wherein the cell identifier of the relay base station is arranged to have controlled correlation with the corresponding cell identifier of the central base station.

14. The apparatus of claim 12, wherein a portion of the cell identifier of the relay base station is arranged to be identical with the corresponding cell identifier of the central base station.

15. The apparatus of claim 12, wherein the one or more memories and the computer program code are further configured, with the one or more processors, to cause the apparatus to perform:
providing linking information linking the cell identifier of the relay base station to the corresponding cell identifier of the central base station.

16. The apparatus of claim 12, wherein the cell identifier of the relay base station is a global cell identifier identifying the relay base station in a public land mobile telecommunication network.

17. The apparatus of claim 12, wherein the one or more memories and the computer program code are further configured, with the one or more processors, to cause the apparatus to perform:
assigning to the relay base station of the wireless telecommunication system the cell identifier from which the corresponding cell identifier of the central base station associated with the relay base station is derivable according to the determined rule.

18. The apparatus of claim 12, wherein said apparatus is a base station.

19. An apparatus comprising:
one or more processors; and
one or more memories including computer program code, the one or more memories and the computer program code configured, with the one or more processors, to cause the apparatus to perform at least the following:
receiving a cell identifier of a relay base station of a cellular radio access network; and
identifying a second central base station associated with the relay base station from the received cell identifier of the relay base station according to a determined rule.

20. The apparatus of claim 19, wherein the one or more memories and the computer program code are further configured, with the one or more processors, to cause the apparatus to perform:
identifying the second central base station associated with the relay base station from at least a portion of the cell identifier of the relay base station, wherein at least the portion of the cell identifier of the relay base station is known to be identical to the corresponding portion of a cell identifier of the second central base station.

21. The apparatus of claim 19, wherein the one or more memories and the computer program code are further configured, with the one or more processors, to cause the apparatus to perform:

checking the one or more memories for linking information linking the cell identifier of the relay base station to a cell identifier of the second central base station and to identify the second central base station from the cell identifier of the relay base station and from the linking information.

22. The apparatus of claim 19, wherein the one or more memories and the computer program code are further configured, with the one or more processors, to cause the apparatus to perform:

identifying the second central base station associated with the relay base station independently.

23. The apparatus of claim 19, wherein said apparatus is a base station.

\* \* \* \* \*